C. F. KNOBLAUCH.
VEHICLE ADVERTISING DEVICE.
APPLICATION FILED MAR. 8, 1920.
1,367,910.
Patented Feb. 8, 1921.
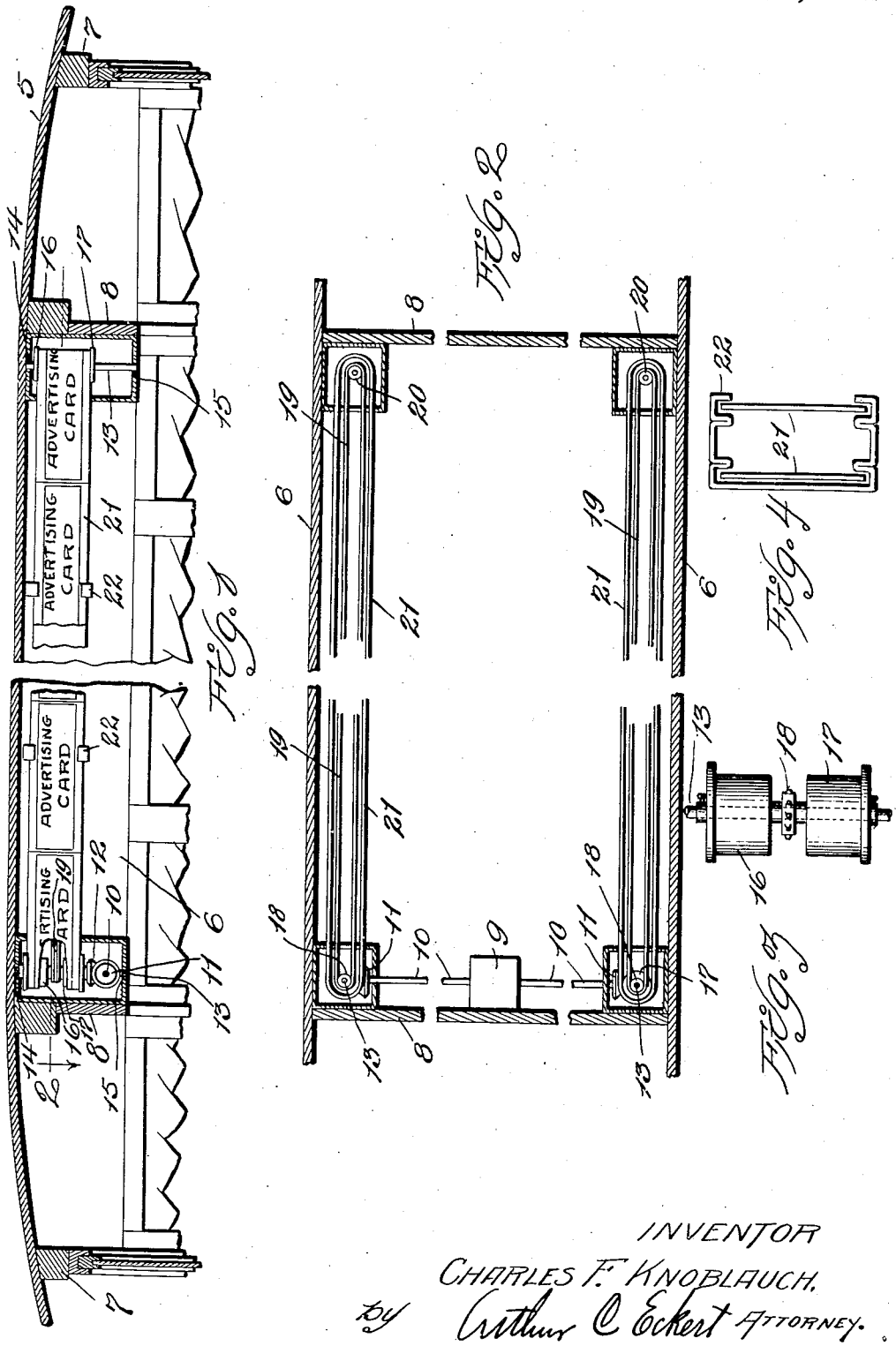
INVENTOR
CHARLES F. KNOBLAUCH.
by Arthur C Eckert ATTORNEY.

UNITED STATES PATENT OFFICE.

CHARLES FRED KNOBLAUCH, OF ST. LOUIS, MISSOURI, ASSIGNOR OF ONE-HALF TO ISHAM SMITHDICKEN, OF ST. LOUIS, MISSOURI.

VEHICLE ADVERTISING DEVICE.

1,367,910.

Specification of Letters Patent.

Patented Feb. 8, 1921.

Application filed March 8, 1920. Serial No. 364,164.

*To all whom it may concern:*

Be it known that I, CHARLES FRED KNOBLAUCH, a citizen of the United States of America, residing at 4512 Newberry Terrace, St. Louis, State of Missouri, have invented certain new and useful Improvements in Vehicle Advertising Devices, of which the following is a specification.

The object of my invention is to produce a movable sign or advertising medium for vehicles, principally street cars. As at present constituted street car advertisements, being stationary, are only visible from a portion of the car and by a portion of the passengers only; furthermore the space is limited and therefore the number of advertisements per car.

By my device, each advertisement or display card will be visible to all the passengers in a car at short time intervals, the number of advertisements that can be placed in a car will be doubled, and the fact that the display cards will be moving continuously, will attract the attention of the passengers to them.

With the above purpose in view, my invention consists in certain novel features of construction and arrangements of parts, as will be hereinafter more fully described, pointed out in the claim and illustrated by the accompanying drawings in which—

Figure 1 is a fragmental longitudinal sectional elevation of the upper part of a car with my device installed.

Fig. 2 is a fragmental sectional plan of my device.

Fig. 3 is a detailed elevation of one of my rollers, and

Fig. 4 is a detailed elevation of one of my belt guides.

Numeral 5 designates a car roof, numeral 6, the car sides, and numerals 7, the car ends, and numeral 8, the partition separating the passenger compartment from the remainder of the car.

Numeral 9 designates a conventional electric motor having the shafts 10.

Since my device is duplicated for both sides of the car as can be best seen in Fig. 2, I will describe one side only. The shafts 10 terminate in the bevel gears 11. In mesh with these gears 11 are positioned the bevel gears 12, which are mounted on the shafts 13, which shafts are rotatively secured in the journal boxes 14 and 15. Secured to the shafts 13 are the rollers 16 and 17, and the sprocket wheel 18. The sprocket chain 19 is placed in operative engagement with the sprocket wheel 18. The chain 19 is positioned the length of the passenger compartment of the car in frictional engagement with the sprocket wheel 20, the rollers 16 and 17, the shaft 13 and journals 14 being duplicated at the opposite end of the passenger compartment as is best seen in Fig. 2.

When the motor 9 is placed in operation, the sprocket chain 19 is made to travel as an endless chain.

Numeral 21 designates an endless belt which is positioned over the rollers 16 and 17, at each end of the passenger compartment in such a manner that when the rollers 16 and 17 are placed in motion, the endless belt is likewise placed in motion.

On this endless belt 21, the advertising cards are placed as shown in Fig. 1. In order to prevent the belt 21 from sagging to hold the advertising cards in the proper position the guides 22 are provided at intervals as shown in Fig. 1.

What I claim and mean to secure by Letters-Patent is—

In a vehicle advertising device, two endless belts, two rollers for each of said belts, each of said belts in frictional engagement with two of said rollers, shafts, said rollers mounted on said shafts, sprocket wheels, one of said wheels mounted on each of said shafts, two sprocket chains, in frictional engagement with said sprockets, bevel gears, one of said gears mounted on each of said shafts, a motor, a motor shaft, bevel gears, one of said gears secured to each end of said motor shaft and in frictional engagement with the aforesaid bevel gears, display matter, and means of securing display matter to said belts, guides, said guides so positioned as to direct the rotative position of said belts.

In testimony whereof I affix my signature.

CHARLES FRED KNOBLAUCH.